United States Patent [19]

Nagano

[11] 4,280,612

[45] Jul. 28, 1981

[54] POSITIONING DEVICE FOR BOTTLES HAVING PROTRUDED OR INDENTED SPOTS

[75] Inventor: Yasuaki Nagano, Kanazawa, Japan

[73] Assignee: Shibuya Kogyo Company, Ltd., Kanazawa, Japan

[21] Appl. No.: 52,493

[22] Filed: Jun. 27, 1979

[51] Int. Cl.[3] .................... B65G 47/24
[52] U.S. Cl. .................... 198/379; 198/394
[58] Field of Search .................... 198/344, 394, 379; 101/38 R, 38 A, 39, 40

[56] References Cited

U.S. PATENT DOCUMENTS

| | | | |
|---|---|---|---|
| 2,980,278 | 4/1961 | Carter | 198/394 |
| 3,363,546 | 1/1968 | Johnson | 101/38 R |
| 3,527,334 | 9/1970 | Wideman | 198/379 |
| 3,934,714 | 1/1976 | Matsumoto | 198/379 |
| 4,007,537 | 2/1977 | Silverbush et al. | 198/394 |
| 4,143,754 | 3/1979 | Eldred | 198/379 |

FOREIGN PATENT DOCUMENTS

| | | | |
|---|---|---|---|
| 1074486 | 1/1960 | Fed. Rep. of Germany | 198/379 |

*Primary Examiner*—Joseph E. Valenza
*Attorney, Agent, or Firm*—Blanchard, Flynn, Thiel, Boutell & Tanis

[57] ABSTRACT

A positioning device for setting a bottle at a predetermined angular position, which device is provided with a bottle supporting mechanism to support the upper end portion of the bottle and a mechanism which imparts relative rotary motion to the bottle and an engaging member or members being brought into engagement with the positioning spot of the bottle. When the engaging member is turned, the bottle is rotated to a predetermined angular position together with the engaging member after the spot is brought into engagement with the engaging member. In the case where the bottle is turned, the bottle is not rotated after the spot is brought into engagement with the fixed engaging member. The bottle supporting mechanism has the function of holding the bottle stably at a precise position and this function is enhanced by the provision of a bottle receiving opening, that is, a wall surface to restrict movement of the outer bottom bottle surface, around the supporting member which supports the bottom portion of the bottle.

8 Claims, 15 Drawing Figures

POSITIONING DEVICE FOR BOTTLES HAVING PROTRUDED OR INDENTED SPOTS

BACKGROUND OF THE INVENTION (1) Field of the Invention

This invention relates to a positioning device for bottles having positioning spots. The positioning device is used for a rotary labeling machine, bottle printing machine or the like in which, by setting the positions or directions of bottles reliably and with accuracy, the application of labels or printing to predetermined areas of bottles can be carried out accurately.

(2) Description of the Prior Art

In the positioning device for bottles having positioning spots in the conventional art, the setting of the angular position of a bottle is generally performed by the method such that a roller is pressed to the outer surface of the bottle under spring force, the bottle is rotated by turning the roller and the rotation of the bottle is stopped by bringing the positioning spot on the bottle wall into contact with a stopper which is disposed at a predetermined position.

In the prior art device, however, the above roller must be pressed to the bottle under the force which is sufficient to turn the bottle. At the same time, the roller and the bottle must be allowed to slip after the engagement of the stopper with the positioning spot of the bottle. It is quite difficult to control the contact pressure between the roller and the bottle surface into the most adequate state. Therefor, the slipping of the roller is often caused to occur, which result in a lowering of the accuracy of the positioning or a loss of the positioning function.

BRIEF SUMMARY OF THE INVENTION

It is, therefore, the primary object of the present invention to provide a positioning device which is used for the precise positioning of bottles, each having a positioning spot.

Another object of the present invention is to provide a positioning device in which the positioning of a bottle is carried out at a predetermined position on a supporting table which holds the bottle.

A further object of the present invention is to provide a positioning device in which the position of the bottle is not changed by the shock which occurs when the spot of the bottle is brought into engagement with an engaging member.

Still a further object of the present invention is to provide a positioning device in which the bottle is not tumbled during the positioning action.

In order to attain the above-described objects, the positioning device of the present invention is characterized in that the device is provided with a bottle supporting device to hold the upper portion of the bottle so as to prevent the bottle from tumbing. Further, any one of the supporting tables carrying thereon a bottle, or the bottle supporting mechanism and the engaging member to be engaged with the positioning spot, is turned once so as to bring the engaging member into engagement with the spot. When the engaging member is turned, the bottle is rotated together with the engaging member to a predetermined angular position, thereby performing the positioning of the bottle. In order to prevent the bottle from tumbling by the shock in the engaging action between the spot and the engaging member, the supporting table carrying thereon the bottle is depressed within an opening which is formed on the transfer table and has a diameter that is about the same as the diameter of the bottle. Therefore, the periphery of the bottom portion of the bottle can be led down into the opening.

BRIEF DESCRIPTION OF THE DRAWINGS

The nature, principle and details of the invention will be more clearly apparent from the following detailed description with respect to preferred embodiments of the invention, taken in conjunction with the accompanying drawings, in which:

FIG. 10 is a plan view of the part which is indicated by the arrow X of FIG. 8;

DETAILED DESCRIPTION OF THE PREFERRED EMBODIMENTS

The present invention will now be described in more detail with reference to the preferred embodiments shown in the accompanying drawings.

Figure 1:
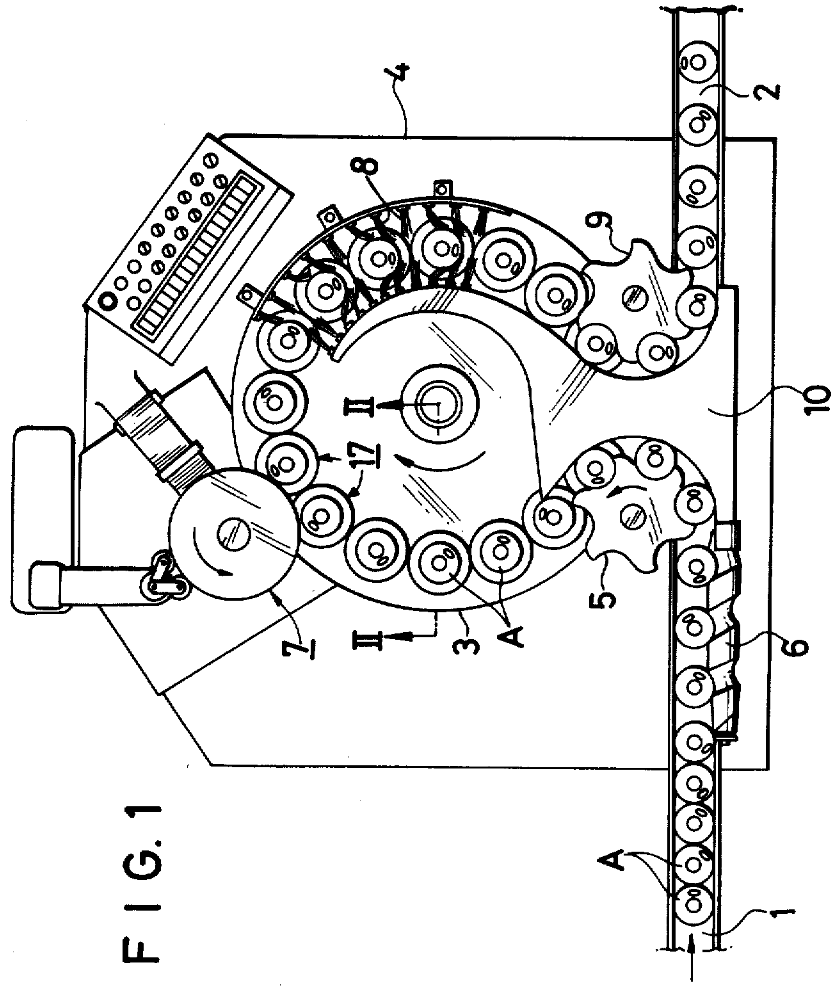
FIG. 1 is a plan view of the main portion of a labeling machine which is exemplified as a machine that is provided with the positioning device for bottles having positioning spots, according to the present invention.

In FIG. 1, a plurality of bottles A are supplied by means of a supply conveyor 1 which is extended to a delivery conveyor 2. The conveyor runs across the machine bed 4 of a labeling machine and the machine bed 4 is provided with a turning device 3. The supply conveyor 1 is provided with a timing screw 6 on its one side and a supply star wheel 5 is rotated in synchronism with the timing screw 6. The bottles A are arranged at regular intervals by the timing screw 6 and they are fed onto the turning device 3 one by one by the star wheel 5. The reference numeral 7 denotes a known labeling mechanism which is installed on the machine bed 4. The downstream side of this labeling mechanism 7 is provided with brush members 8. The labeled bottles A are delivered from the turning device 3 to the delivery conveyor 2 by a delivery star wheel 9. Disposed between both the star wheels 5 and 9 is a guide 10 which guides the bottles A between the turning device 3 and the conveyors 1 and 2.

Figure 2:
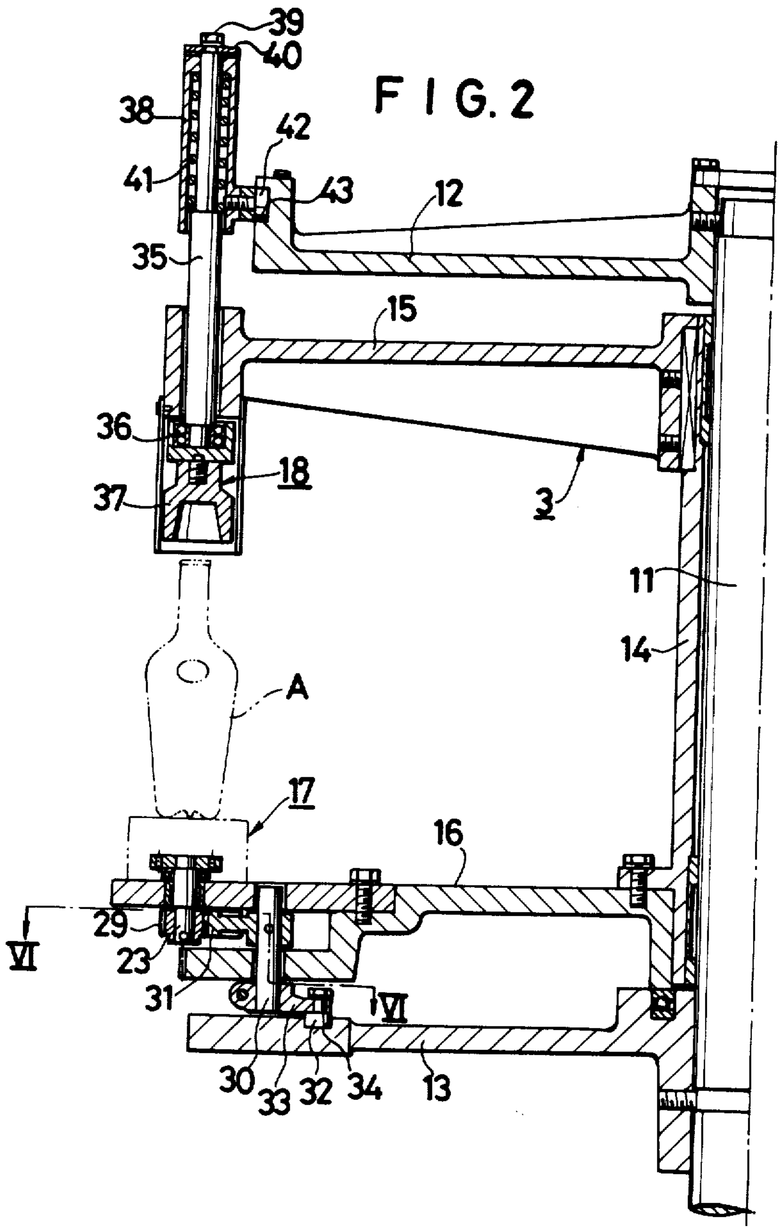
FIG. 2 is a vertical cross-sectional view of the labeling machine which is taken along the line II—II of FIG. 1.

In FIG. 2, the reference numeral 11 denotes a vertically disposed stationary main shaft which is provided at its upper and lower ends with a pair of fixed cam disks 12 and 13. Between the cam disks 12 and 13, the main shaft 11 rotatably supports a cylinder 14 which carries at its upper end a disk 15 and at its lower end a transfer table 16. The aforementioned turning device 3 is composed of the cylinder 14, disk 15 and transfer table 16. This turning device 3 is rotated about the axis of the main shaft 11 by a driving source (not shown).

On the periphery of the transfer table 16 of the turning device 3, the bottles A are supplied one by one by the supply star wheel 5 and a plurality of positioning mechanisms 17 are disposed at regular intervals so as to determine the positions of the bottles A. Bottle supporting mechanisms 18 are disposed right above the respective positioning mechanisms 17, on the periphery of the upper disk 15.

Figures 3, 5:
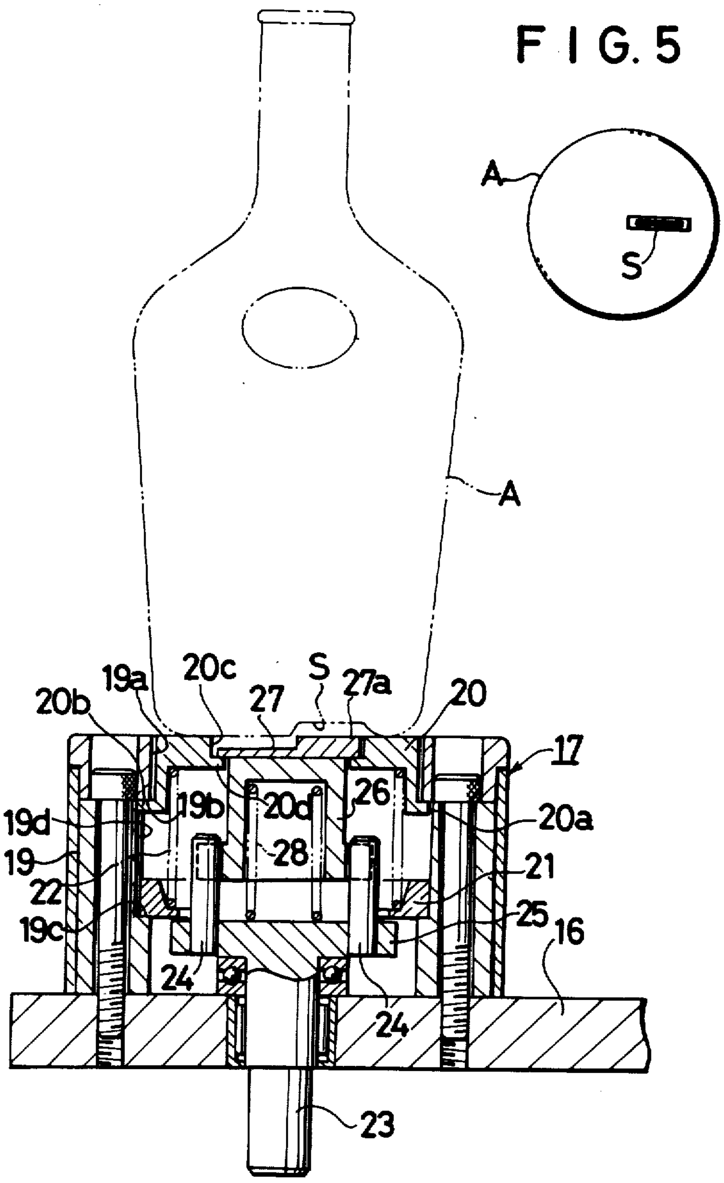
FIG. 3 is a vertical cross-sectional view of an embodiment of the positioning device of the present invention.
FIG. 5 is a bottom view of the bottle having a spot in the bottom surface.

As shown in FIG. 3, the above-mentioned positioning mechanism 17 has a cylindrical member 19 which is fixed to the transfer table 16. The diameter of the upper opening 19*a* of this cylindrical member 19 is made about the same as the outer diameter of the bottom portion of a bottle A. The diameter of the inner middle portion of the cylindrical member 19 is made somewhat larger than its upper and lower portions, thereby forming shoulders 19*b* and 19*c*. A supporting table 20 for supporting the under surface of the bottle A is vertically slidably fitted into the opening 19*a* of the cylindrical member 19. Between this supporting table 20 and a spring seat 21 which is held by the lower shoulder 19*c*, a spring 22 is interposed so as to maintain the supporting table 20 at the upper end position. Formed on the lower peripheral edge of the supporting table 20 is a flange 20*a* which is brought into engagement with the upper shoulder 19*b*. When the supporting table 20 is urged upward by the force of the spring 22 and the flange 20*a* is thus brought into contact with the shoulder 19*b*, the upper surface of the cylindrical member 19 and the upper surface of the supporting table 20 are positioned on the same horizontal plane. Further, a portion of the flange 20*a* is protruded to form a projection 20*b* which is received in a guide groove 19*d* that is formed in the inside wall of the cylindrical member 19, thereby restricting the rotation of the supporting table 20.

The transfer table 16 carrying the cylindrical members 19 is provided with rotary shafts 23, each of which is rotatable and aligned with the axis of each cylindrical member 19. Attached to the upper end of this rotary shaft 23 is a plate member 25 which is provided with a pair of parallel guide pins 24. A cylindrical member 26 is fitted to the guide pins 24 so as to be vertically moved along the pins 24. The upper portion of this cylindrical body 26 is slidably passed through the opening 20*c* which is formed in the middle portion of the supporting table 20. A disk like engaging member 27 is attached to the upper end face of the cylindrical member 26 and the engaging member 27 is provided with an engaging portion 27*a* which comes into engagement with the groove-like spot S (see FIG. 5) that is defined in the bottom wall surface of the bottle A. The peripheral portion of the under surface of this engaging member 27 is generally brought into contact with the projection 20*d* which is formed in the lower portion of the opening 20*c* of the above-mentioned supporting table 20, by the weights of the engaging member 27 and the cylindrical member 26. Further, in such a state, the top surface of the engaging portion 27*a* does not extend above the upper surface of the supporting table 20. The cylindrical member 26 holds therein a spring 28 which is disposed on the plate member 25. In the ordinary state, a certain clearance is left between the upper end of the spring 28 and the upper inner wall surface of the cylindrical member 26 so that the engaging member 27 does not rise above the supporting table 20, while, in the case where the supporting table 20 is pushed down against the force of the spring 22, the engaging member 27 is protruded above the supporting table 26 by the force of the spring 28, thereby enabling the engagement of the engaging portion 27*a* with the spot S of the bottle A.

Figure 6:
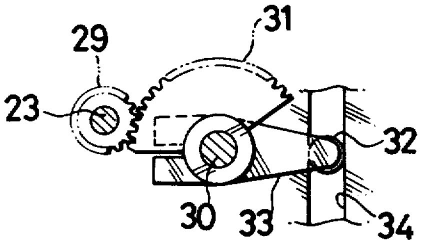
FIG. 6 is a cross-sectional view taken along the line VI—VI of FIG. 2.

Further, as shown in FIGS. 2 and 6, a pinion 29 is fixed to the lower end of the rotary shaft 23 and is brought into engagement with a sector gear 31 which is fixed to a shaft 30 that is pivotally secured to the transfer table 16. Further, attached to the lower end of the shaft 30 is an arm 33 which has a cam follower 32 at its free end. The cam follower 32 is brought into engagement with a cam groove 34 which is formed in the peripheral portion of the disk 13 that is fixed below the transfer table 16. Accordingly, when the transfer table 16 is turned about the main shaft 11, the cam follower 32 runs through the cam groove 34, and the arm 33 is rocked in accordance with the configuration of the cam groove 34. Thus, the gear 31 is turned through the shaft 30 and this turning is transmitted to the cylindrical member 26 and its integral engaging member 27 by way of the pinion 29, rotary shaft 23, plate member 25 and guide pins 24. Therefore, the engaging portion 27*a* is brought into engagement with the spot S of the bottle A.

Further, the above-mentioned bottle supporting mechanism 18 is provided, as shown in FIG. 2, with a sliding rod 35 which is vertically movably attached to the peripheral portion of the disk 15, and a bottle supporting member 37 which is rotatably attached to the lower end of the sliding rod 35 by way of a bearing 36. As described above, the sliding rod 35 and bottle supporting member 37 are disposed right above each positioning mechanism 17. The upper portion of the sliding rod 35 is slidably passed through the axis of a cylindrical member 38 and a plate 40 is attached to the upper end of the sliding rod 35 with a nut 39, thereby preventing the sliding rod 35 from the slipping off from the cylindrical member 38. Within the cylindrical member 38 is held a spring 41 which urges the sliding rod 35 downward. On the lower side surface of the cylindrical member 38, a cam follower 42 is attached, which is brought into engagement with a cam groove 43 that is formed in the peripheral side surface of the fixed disk 12.

Figure 4:
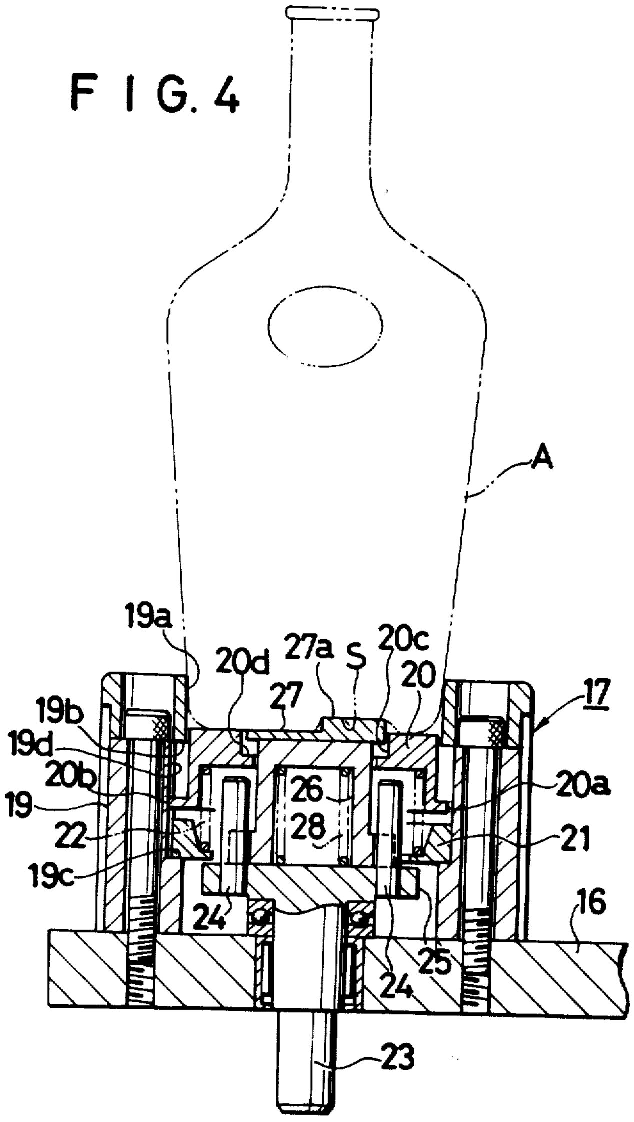
FIG. 4 is a vertical cross-sectional view of the device of FIG. 3, wherein the positioning of the bottle having a spot is carried out.

With the above-described structure, when a bottle A is fed on the supporting table 20 of the positioning mechanism 17 by means of the supply star wheel 5 (see FIG. 2), the bottle supporting member 37 is immediately moved down by the cam mechanism 43 to hold the upper end portion of the bottle A. At the same time, the bottle supporting member 37 slightly pushes down the bottle A and the supporting table 20 against the force of the spring 22. Thus, as shown in FIG. 4, the spring 28 held in the cylindrical member 26 comes into contact with the upper inside wall of the cylindrical member 26, thereby urging the cylindrical member 26 and the engaging member 27 upward and the engaging portion 27a of the engaging member 27 is protruded above the upper surface of the supporting member 20 and the engaging portion 27a of the engaging member 27 now becomes ready to be fitted into the spot S of the bottle A. However, since the direction of the bottle A that is fed on the positioning mechanism 17 by the supply star wheel 5 is not controlled at all, the engaging portion 27a cannot generally be fitted directly into the spot S and is urged to a bottom surface of the bottle other than the spot S.

When the turning device 3 is rotated in this state, the engaging member 27 is turned through the cam follower 32, arm 33, shaft 30, gear 31, pinion 29, rotary shaft 23, plate member 25, guide pin 24 and cylindrical member 26 by the function of the cam groove 34. The bottle A is supported on the supporting table 20 which is not rotated by the engagement between the projection 20b and the guide groove 19d. Therefore, the engaging portion 27a of the engaging member 27 is relatively rotated while in contact with the bottom surface of the bottle A, and finally the engaging portion 27a is brought into engagement with the spot S of the bottle A. When the engaging portion 27a that is fitted into the spot S is rotated further, the bottle A is turned on the supporting table 20 together with the engaging portion 27a.

Accordingly, with the engaging portion 27a being at any position, when the bottle A is fed on the positioning mechanism 17 from the supply star wheel 5 as shown in FIG. 1 and the engaging portion 27a is turned more than 360 degrees and is stopped at a certain position before the bottle A is transferred to the position of the labeling mechanism 7 on the downstream side while lightly depressing the bottle A by means of the bottle supporting mechanism 18, the engaging portion 27a comes into engagement with the spot S without fail and then turns together with the bottle A. Therefore, by stopping the engaging member 27 at a certain position, the angle of the bottle A can be set at a predetermined angular position.

When the positioning of the bottle A is completed, the bottle supporting member 37 is further moved down by the cam groove 43 and the bottle A is firmly supported. The firmly supported bottle A is then passed through the labeling mechanism 7, in which a label in applied to the predetermined point of the bottle A by the labeling mechanism 7 in like manner as those of the conventional art. When the bottle A has been labeled, the engaging portion 27a is turned for 90 degrees in like manner as above from the above-mentioned state, thereby orienting the center of the applied label on the bottle A in the direction of the advancing of the bottle A. In this state, the bottle A is passed between the brush members 8 as shown in FIG. 1, where the above label is completely stuck on the bottle A by the brush members 8. When the label application is thus completed, the bottle supporting member 37 is raised to the original position and the bottle A is also raised on the horizontal plane of the original position of the upper surface of cylindrical member 19 by the force of the spring 22 which urges the supporting member 20 upward, and the bottle A is then delivered onto the delivery conveyor 2 by means of the delivery star wheel 9.

In the above-described embodiment, the positioning is done by turning the engaging member 27 for more than 360 degrees. However, for example, when one side surface of a bottle is symmetrical with the other side surface thereof, the label may be applied to either one of them, so that the above-described spot S may be formed in the center portion of the bottom surface of the bottle A and the positioning can be done by turning the engaging member for 180 degrees.

Figure 7:
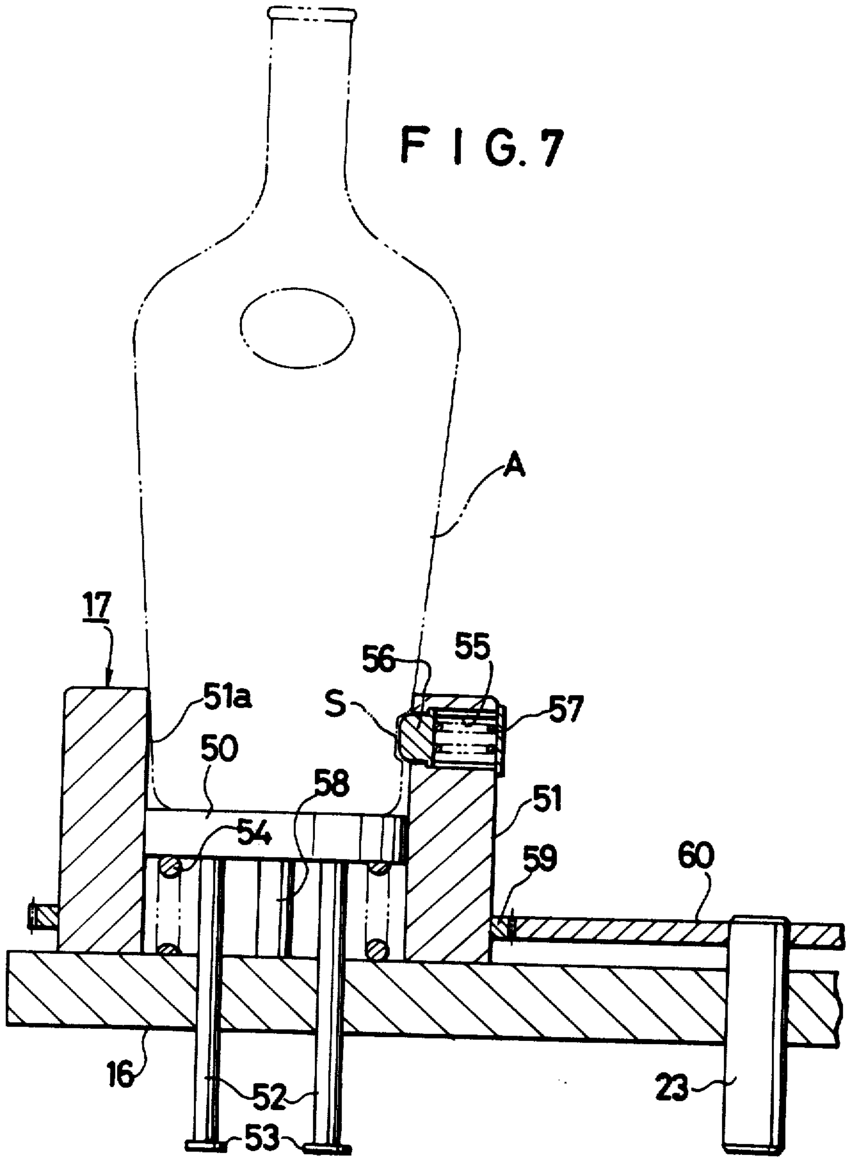
FIGS. 7, 8 and 9 are vertical cross-sectional views of other embodiments of the positioning devices of the present invention.

In the following, another embodiment of the present invention will be described with reference to FIG. 7. In this embodiment, the bottle A is provided with a groove-like spot S in the outer side wall of the bottle A. The positioning mechanism 17 in this embodiment comprises a disk-like supporting table 50 for supporting the bottom surface of the bottle A, and a cylindrical member 51 which rotates about the axis of the supporting table 50. Attached to the under surface of the supporting table 50 are a pair of sliding rods 52 which slidably pass through the above-described transfer table 16. By these slidable rods 52, the supporting table 50 is kept from rotation. A spring 54 pushes the supporting table 50 upward, while the sliding rods 52 are provided with stoppers 53 at their lower ends so that supporting table 50 is not lifted off from the cylindrical member 51. In the state that the stoppers 53 are pressed to the under surface of the transfer table 16, the upper surface of the supporting table 50 and the upper surface of the cylindrical member 51 are disposed on the same horizontal plane.

In the upper portion of the above cylindrical member 51, an opening 55 is formed in the direction of a radius and an engaging member 56 is slidably fitted through the opening 55. The end portion of this engaging member 56 is generally protruded from the inside wall of the axial opening 51a of the cylindrical member 51 by the force of a spring 57. Further, the upper and the lower edges of this engaging member 56 are rounded so as not to hinder the functions where the bottom portion of the bottle A is inserted into the opening 51a of the cylindrical member 51 when the bottle is lowered and where the lowered supporting table 50 is returned to its upper original position by the force of the spring 54. Further, the transfer table 16 is provided with a stopper 58 under the supporting table 50. Thus, the supporting table 50 is not moved down below the level on which the engaging member 56 comes into engagement with the spot S of the bottle A.

Further, a gear 59 is fixed to the outer surface of the cylindrical member 51 and this gear 50 is in mesh with another gear 60 which is fixed to the rotary shaft 23 that is rotated by means of the foregoing cam mechanism 34 and so forth. Other structures in this embodiment are the same as those of the above-described embodiment.

Accordingly, in this embodiment, when the bottle A is fed on the supporting table 50 of the positioning mechanism 17 by the supply star wheel 5, the bottle supporting member 37 is moved down in like manner as the former embodiment and the upper end portion of the bottle A is supported. At the same time, the bottle A and the supporting table 50 which holds this bottle A are moved down against the force of the spring 54, thus the supporting table 50 is lightly pressed to the stopper 58. In this state, the engaging member 56 is slid into the opening 55 against the force of the spring 57, wherein the engaging member 56 does not hinder the lowering of the bottle A. Furthermore, in this state where the supporting table 50 is brought into contact with the stopper 58, both the spot S of the bottle A and the engaging member 56 are aligned on an engageable level. Further, in like manner as the foregoing embodiment, the engaging member 56 is turned for over 360 degrees by means of the rotary shaft 23, gears 60 and 59, and the cylindrical member 51, in interlocked relation with the rotation of the transfer table 16, and the engaging member 56 is stopped at a predetermined position, thereby attaining the positioning of the bottle A.

Figure 8:
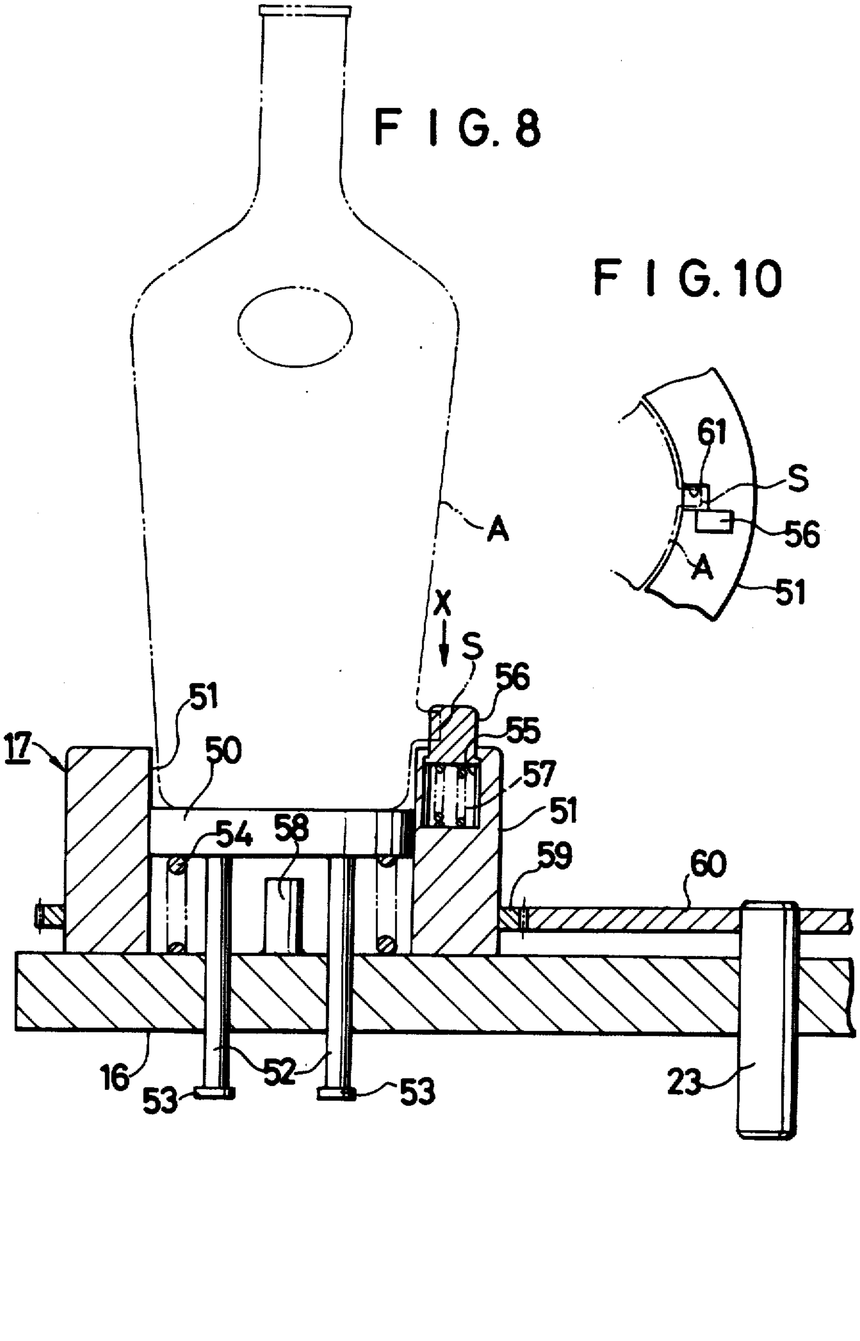

When the bottle A is provided with a protruded spot S on its outer surface, the space between the bottle A and the cylindrical member 51 may be enlarged so as to receive the protruded spot S in the cylindrical member 51. However, in this case, as shown in FIG. 8, it is desirable that the engaging member 56 is allowed to stick out from the upper surface of the cylindrical member 51 without enlarging the space between both members. If the clearance between the bottle A and the opening 51*a* of the cylindrical member 51 or the opening 19*a* of the cylindrical member 19 in the foregoing embodiment is made narrow, the lateral movement of the lower portion of the bottle A can be avoided when the lower portion of the bottle A is printed or applied with a label. Therefore, the printing or the application of a label to the bottle A can be performed reliably.

Further, being different from the case of the groove-like spot, when the bottle A is provided with a protruded spot S as in this embodiment, the bottle A cannot be turned reversely as it stands. For example, when the bottle A is to be turned reversely for 90 degrees, it is necessary that the engaging member 56 is turned positively for 270 degrees or that the engaging member 56 is reversely turned for 360 degrees so as to bring the engaging member 56 into contact with the opposite side of the spot S, and then the bottle A is turned reversely for 90 degrees together with the engaging member 56. In this case, as shown in FIG. 10, an engaging groove 61 to receive the spot S is formed in the upper surface of the cylindrical member 51 near the engaging member 56. After the positioning of the bottle A is finished with the engaging member 56, the bottle A is further moved down by the bottle supporting member 37 so as to bring the spot S into engagement with the engaging groove 61. Therefore, the rotation of the bottle A in the opening 51*a* of the cylindrical member 51 is controlled in both directions so that the reverse rotation of the bottle A can easily be carried out.

Furthermore, as will be clearly understood from the above description, the supporting tables 20 and 50 are vertically slidably disposed in the cylindrical members 19 and 51 of the transfer table 16, respectively. These are provided in order to prevent the bottom portion of the bottle from lateral movement. If the lateral movement of the bottom portion can be allowed to some extent, or there is no fear of the occurrence of such the lateral movement, these members can be omitted. Therefore, the structure of the positioning mechanism 17 can be simplified.

Figure 9:
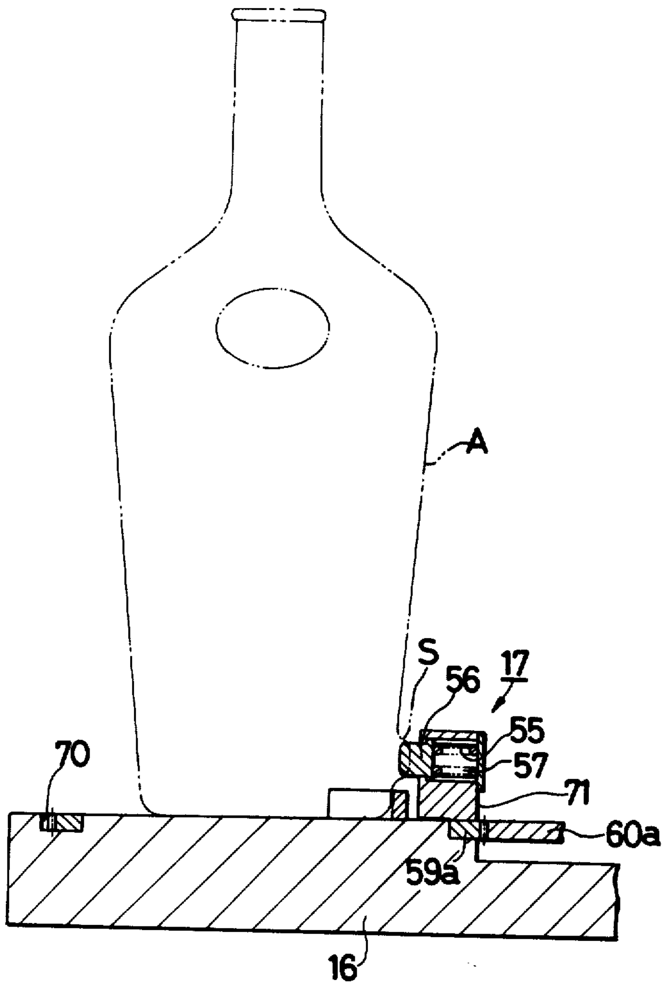

FIG. 9 shows such an embodiment. In the positioning mechanism 17 of this embodiment, the above-mentioned transfer table 16 is provided with circular grooves 70. A gear 59*a* which corresponds to the foregoing gear 59 is rotatably fitted into each groove 70 and the gear 59*a* is brought into engagement with another gear 60*a* which corresponds to the foregoing gear 60. To a portion of the upper surface of the gear 59*a*, a support post 71 which does not obstruct the supply and delivery of bottle A is attached. Installed within this support post 71 is an engaging member 56 which is applied with force by a spring 57 in like manner as the foregoing embodiments. The height of the engaging member 56 is of course made the same as the height of the spot S of the bottle A to be positioned.

Accordingly, also in this embodiment, the engaging member 56 is positioned so as not to hinder the bottle A from coming in or going out. The bottle A which is supplied to a predetermined position by the supply star wheel 5 and the guide 10, is supported lightly by the bottle supporting member 37 and, in this state, the above-mentioned support post 71, that is, that engaging member 56, is turned for more than 360 degrees by means of the gears 60*a* and 59*a* and the engaging member 56 is stopped at a predetermined position, thereby performing the positioning of the bottle A.

Further, as the rotary driving mechanism to rotate the engaging members 27 and 56, electric motors or other suitable devices may be employed beside the above-described mechanism with a cam groove.

In the above embodiments, the positioning of the bottle is performed by turning the engaging member which then engages with the spot of the bottle. In the following embodiment, the engaging member is fixed while the bottle is turned so as to perform the positioning.

Figure 11:
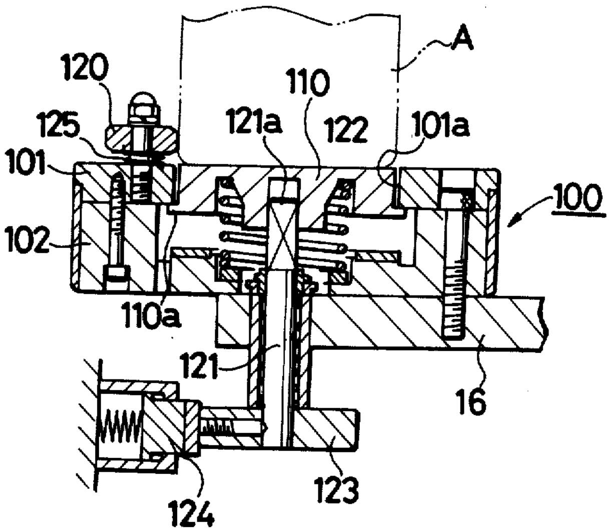
FIG. 11 is a vertical cross-sectional view of another embodiment of the positioning device of the present invention, wherein the engaging member for the spot is fixed, while the supporting table for the bottle is rotated.

FIG. 11 shows a positioning mechanism 100 which is formed on the transfer table 16 like those of the foregoing embodiments. Attached to the transfer table 16 is a cylindrical member 102 which carries thereon an upper plate 101. An engaging pawl 120 is pivotally secured to the upper plate 101. A supporting table 110 is held within the cylindrical member 102 and a rotary shaft 121 is rotatably secured to the transfer table 16. The upper square portion 121*a* of the shaft 121 is slidably fitted into the center portion of the supporting table 110, and thus the supporting table 110 can be moved vertically. Further, the supporting table 110 is urged upward by a compression spring 122, while the upward movement of the supporting table 110 is stopped at the upper end position by the provision of a flange 110*a* which is brought into contact with the upper plate 101. In this upper end position, the top surfaces of the supporting table 110 and the upper plate 101 coincide with each other in their heights. The diameter of the opening 101*a* of the upper plate 101 is a little larger than the outer diameter of the bottle A. The inside wall of the opening 101*a* constitutes a retaining wall which surrounds the bottom portion of the bottle A. Integrally attached to the lower end of the above rotary shaft 121 is a friction roller 123. A friction plate 124 which is in contact with this friction roller 123 and drives the roller, is formed along the locus of the movement of the friction roller 123.

Figure 13:
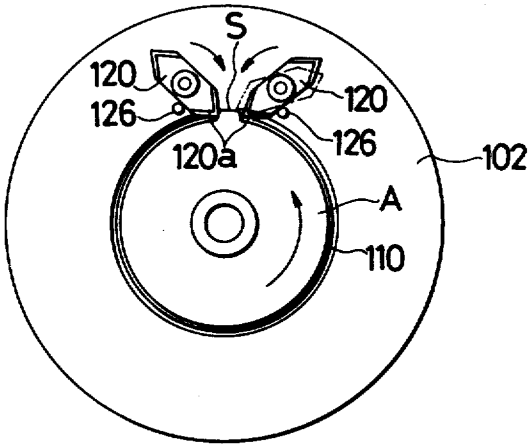
FIGS. 12 and 13 are plan views of the embodiments of FIG. 11, wherein the structures thereof are partially different.
Figure 12:
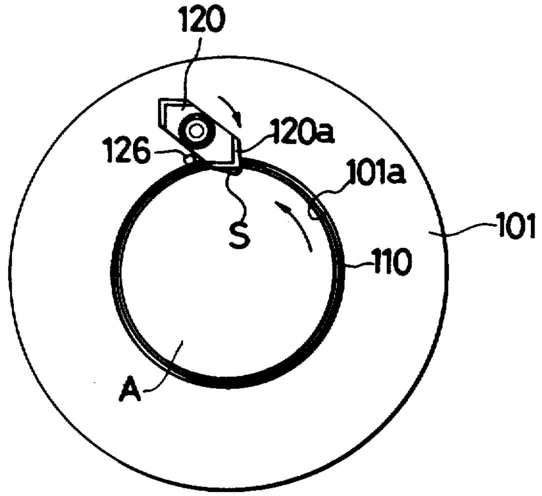

As shown in FIG. 12, a single engaging pawl 120 is pivotally secured to the upper plate 101 of the cylindrical member 102. In another embodiment, a pair of engaging pawls 120 are used as shown in FIG. 13. In the case of the embodiment of FIG. 12, the engaging pawl 120 is disposed such that the tip end 120*a* of the pawl 120 is brought into engagement with the indented spot S of the bottle A. Further, when the bottle A is turned in the direction of the arrow on the same figure after the engaging pawl 120 has been brought into engagement with the spot S, the engaging pawl 120 is turned in the reverse direction of the turning of the bottle A so that the tip end 120*a* of the pawl 120 is protruded toward the inside of the supporting table 110. Further, this engaging pawl 120 is urged in the direction of the arrow on FIG. 12 by a torque spring 125 (see FIG. 11). Thus the tip end 120*a* of the pawl is actuated toward the inside of the supporting table 110, however the protrusion of the pawl 120 is restricted to a certain extent by a stopper pin 126 as shown in FIG. 12.

Meanwhile, as shown in FIG. 13, the pair of engaging pawls 120 is so disposed that the tip ends 120*a* of the pawls 120 nip the spot S of the bottle A and both the engaging pawls 120 are urged in directions opposite to each other as shown by the arrows on FIG. 13 by means of torque springs 25 (see FIG. 11) in like manner as the case of FIG. 12. Therefore, the tip ends 120*a* of pawls 120 are protruded in the direction of the inside of the supporting table 110. The protruded ends of both the engaging pawls 120 are regulated by the stopper pins 126.

In the device having the above-described structure, when the bottle A is fed on the supporting table 110 that is held above the transfer table 16 by the above-mentioned bottle supplying devices, the bottle supporting member 37 is moved down to hold the upper end portion of the bottle A and, at the same time, the bottle A and the supporting table 110 carrying the bottle A are lowered against the force of the compression spring 122. Accordingly, the peripheral surface of the bottom portion of the bottle A is surrounded by the inside wall of the opening 101*a* of the upper plate 101 that is held on the cylindrical member 102. Further, the distance of lowering in this operation is so determined that the spot S of the bottle A is shifted to the same level as that of the engaging pawl 120. Further, in this state, since the direction of the bottle A is not controlled at all, the engaging pawl 120 cannot come into engagement with the spot S generally and the pawl 120 is pressed to an outer wall portion other than the spot S.

When the transfer table 16 is further turned from the above state, the friction plate 124 located at the predetermined position and the friction roller 123 of the positioning mechanism 100 are brought into contact with each other and, with the turning of the transfer table 16, the friction roller 123, rotary shaft 121, supporting table 110 and the bottle A on the supporting table 110 are turned. Thus, in the structure of FIG. 12, when the bottle A is turned in the direction of the arrow, the tip end 120*a* of the pawl 120 which has been in contact with the side wall of the bottle A other than the spot S, comes into engagement with the indented spot S by the force of the torque spring 125. When the engaging pawl 120 is brought into engagement with the spot S, the tip end 120*a* of the pawl 120 is urged further in the direction of the inside of the supporting table 110 by the rotary force of the bottle A. Therefore, the bottle A is pushed by the pawl 120 and it is pressed toward the wall surface of the opening 101*a* on the opposite side of the pawl 120. Accordingly, the positioning of the bottle A is accomplished in this state and the bottle A is not turned any more. Thus, even though the friction plate 124 and the friction roller 123 are held in contact, the friction plate 124 and the friction roller 123, or the supporting table 110 and the bottle A are caused to slip.

Further, in the structure shown in FIG. 13, the engaging pawl 120 on the right side is turned by the protruded spot S of the bottle A into the position as indicated by the broken line against the force of torque spring 125 when the bottle A is turned in the direction of the arrow, and when the one side of the spot S comes into engagement with the tip end 120*a* of the engaging pawl 120 on the left side, the engaging pawl 120 on the right side is immediately brought into engagement with the other side of the spot S by the force of the torque spring 125. Therefore, as shown by the solid lines on FIG. 13, the spot S is nipped between the tip ends 120*a* of the pair of engaging pawls 120, thereby accomplishing the positioning of the bottle A. After the positioning of the bottle A, a label is applied to the predetermined point on the bottle as described above. By the way, in order to simplify the structure of the above embodiment, the bottle direction changing mechanism which, after the application of label, is necessary for passing the bottle A among the brush members is omitted, however the mechanism may easily be provided if it is required by utilizing the foregoing art to turn the cylindrical member 102 on the transfer table 16.

Figure 14:
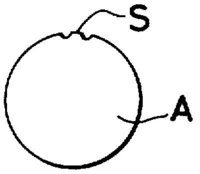
FIG. 14 is a bottom view of a bottle which has a spot on the outer surface in the bottom portion of the bottle.

Shown in FIG. 14 is another embodiment of a protruded spot S of the bottle A. In the embodiment of FIG. 13, the spot S is raised from the side wall of the bottle A, however, in the embodiment of FIG. 14, the protruded spot S is formed by depressing the circumferential portion of the spot S. The present positioning device can also be used for bottles A having such spots S.

Figure 15:
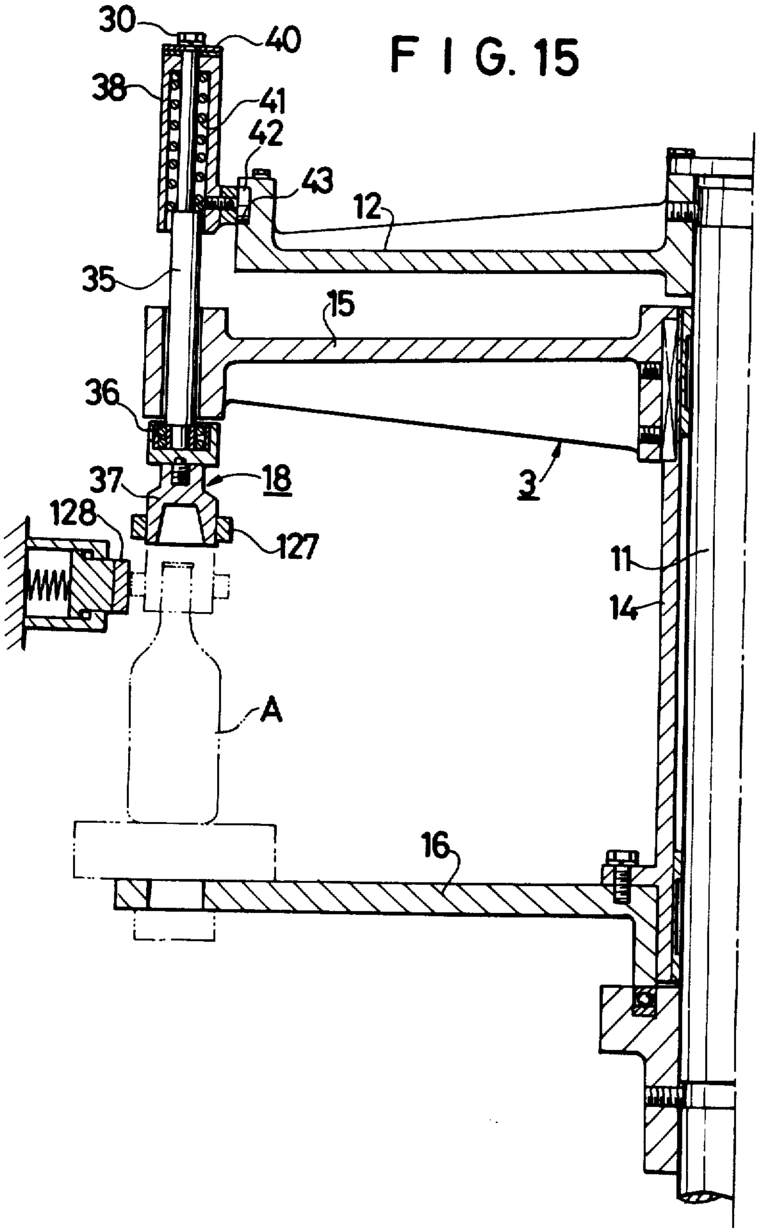
FIG. 15 is a vertical cross-sectional view of another embodiment of a bottle turning mechanism.

Further, FIG. 15 shows another embodiment of the mechanism to rotate the bottle A. In this embodiment, the bottle supporting member 37 of the bottle supporting mechanism 18 is provided with a friction ring 127 in order to rotate the bottle A by means of the bottle supporting mechanism 37. Further, when the bottle supporting member 37 is moved down and the bottle A is held by the member 37, the friction ring 127 is brought into contact with a friction plate 128 which is disposed around the transfer table 16. Also in this embodiment, it will be apparent that the bottle A may be rotated until the spot S comes into engagement with the engaging pawl 120. The friction plate 128 or 124 may of course have a length sufficient to rotate once the bottle A with the turning of the turning device 3.

Further, it goes without saying that the present invention can be applied not only to labeling machines but also to other various bottle treating machines such as printing machines in which the positioning of bottles is required.

Although the present invention has been described in connection with preferred embodiments thereof, many variations and modifications will now become apparent to those skilled in the art. It is preferred, therefore, that the present invention be limited not by the specific disclosure herein but only by the appended claims.

What is claimed is:

1. In a positioning device for use with a bottle having a positioning spot on the bottom thereof, said positioning device being adapted for positioning the bottle at a predetermined angular position, the combination comprising:

a transfer table;

mounting means mounted on said transfer table;

a supporting table supported on said mounting means for vertical movement between a first elevated position and a second depressed position, said supporting table having a central opening therethrough and being adapted to support the bottle;

means for preventing rotation of said supporting table relative to said mounting means;

an engaging member disposed in said central opening of said supporting table, means supporting said engaging member for rotation and for vertical upward movement relative to said supporting table, said engaging member having engaging means thereon adapted to extend above the upper surface of said supporting table when said supporting table is in said second depressed position for engaging the positioning spot of the bottle disposed on said supporting table for effecting rotation of the bottle when said engaging member is rotated;

first resilient means cooperable with said supporting table for urging said supporting table toward said first position;

second resilient means cooperable with said engaging member for urging said engaging member upwardly with respect to said mounting means and said supporting table when said supporting table is moved to said second depressed position;

means spaced above said supporting table and cooperable with the top of the bottle disposed on said supporting table for moving the bottle, said supporting table and said engaging member downwardly against the urging of said first and second resilient means so that said engaging means becomes positioned above the upper surface of said supporting table; and drive means cooperable with said engaging member for effecting rotation of said engaging member relative to said mounting means and said supporting table so that said engaging means is moved into engagement with said positioning spot.

2. The positioning device of claim 1, wherein said mounting means comprises a substantially vertical sleeve having a cylindrical opening therethrough which is of slightly lesser diameter than the bottle on said supporting table, said supporting table being concentrically disposed within said sleeve so that the top of said supporting table is below the top of said sleeve when said supporting table is in said second position, whereby the walls of said sleeve opening prevent lateral movement of the bottle when said supporting table is in said second position.

3. The positioning device of claim 2, wherein said means for preventing rotation of said supporting table relative to said mounting means comprises a vertical guide groove provided in the surface of said sleeve opening and a radially outwardly projecting leg on said supporting table which is slidably received in said guide groove.

4. The positioning device of claim 1, wherein said drive means includes a vertical shaft extending coaxially with said sleeve and rotatably supported in said transfer table, and means for drivingly coupling said shaft to said engaging member.

5. The positioning device of claim 4, wherein said shaft is fixed against vertical movement relative to said transfer table and said means for coupling said shaft to said engaging member includes a plurality of upright guide pins supported on the upper end of said shaft and means on said engaging member axially slidably cooperable with said guide pins for effecting driving rotation of said engaging member by said shaft in response to rotation of said shaft.

6. The positioning device of claim 4, wherein said drive means comprises:

cam means supported beneath said transfer table and movable relative to said transfer table;

a cam follower arm pivotally supported on said transfer table and having a cam follower thereon cooperable with said cam means for effecting pivotal movement of said cam follower arm in response to said relative movement between said transfer table and cam means; and gear means cooperable with said cam follower arm and said shaft for effecting rotation of said shaft in response to said pivotal movement of said cam follower arm.

7. The positioning device of claim 4, wherein said engaging member is a vertical cylinder having a vertical cylindrical opening in the bottom thereof, said engaging means includes an upward projection on the top of said engaging member, and said second resilient means is a helical spring coaxial with said shaft and having its upper end received within said cylindrical opening in said engaging member and its lower end disposed against the upper end of said shaft.

8. The positioning device of claim 7, including an annular, upwardly facing spring seat provided on the surface of said sleeve opening beneath said supporting table, said first resilient means being a helical spring encircling said engaging member within said sleeve and having its upper end disposed against the undersurface of said supporting table and its lower end disposed against said annular spring seat.

* * * * *